United States Patent [19]
Fothergill et al.

[11] 3,859,279
[45] Jan. 7, 1975

[54] BENZOFURAN DERIVATIVES AND PROCESSES THEREFOR

[75] Inventors: Graham Alwyn Fothergill, Knebworth; John Mervyn Osbond, Hatfield; James Charles Wickens, St. Albans, all of England

[73] Assignee: Hoffmann-La Roche Inc., Nutley, N.J.

[22] Filed: Apr. 10, 1972

[21] Appl. No.: 242,808

[30] Foreign Application Priority Data
Apr. 20, 1971 Great Britain............... 10043/71

[52] U.S. Cl......... 260/240 J, 260/346.2 R, 424/285
[51] Int. Cl.............................................. C07d 5/40
[58] Field of Search.................. 260/240 J, 346.2 R

[56]         References Cited
         UNITED STATES PATENTS
2,955,108  10/1960  Omietanski......................... 260/205

FOREIGN PATENTS OR APPLICATIONS
1,106,057  3/1968  Great Britain............... 260/346.2 R
1,106,058  3/1968  Great Britain............... 260/346.2 R
1,123,974  8/1968  Great Britain............... 260/346.2 R
1,152,871  5/1969  Great Britain............... 260/346.2 R
   58,092  10/1967  Germany..................... 260/346.2 R OTHER PUBLICATIONS
Burger, Medicinal Chemistry, 2nd Ed., pp. 75–76, Interscience Publishers, Inc. N.Y. (1960).

*Primary Examiner*—John D. Randolph
*Attorney, Agent, or Firm*—Samuel L. Welt; Jon S. Saxe; George M. Gould

[57]            ABSTRACT
Benzofuran derivatives of the formula

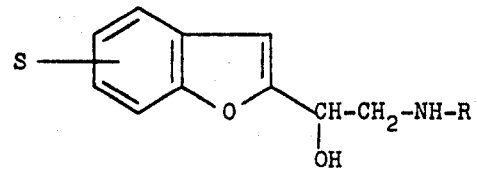

wherein R represents an isopropyl, isobutyl, secbutyl or tertbutyl group and S represents a group of the formula

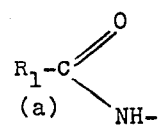

or
b. $R_2$—$SO_2$—NH— in which $R_1$ represents a lower alkyl, lower alkenyl, lower alkadienyl, lower alkynyl, lower cycloalkyl, lower cycloalkyllower alkyl, aryl, aryl-lower alkyl, aryllower alkenyl or aryl-lower alkynyl group and $R_2$ represents a lower alkyl, lower alkenyl or aryl group and acid addition salts thereof are useful as β-adrenergic blocking agents.

27 Claims, No Drawings

BENZOFURAN DERIVATIVES AND PROCESSES THEREFOR

DETAILED DESCRIPTION OF THE INVENTION

The present invention is concerned with benzofuran derivatives and processes for the preparation thereof.

The benzofuran derivatives provided by the invention are compounds of the general formula

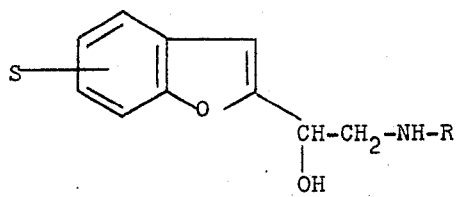

wherein R represents an isopropyl, isobutyl, secbutyl or tertbutyl group and S represents a group of the formula

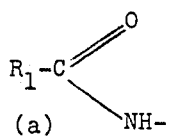

or b. $R_2$—$SO_2$—NH— in which $R_1$ represents a lower alkyl, lower alkenyl, lower alkadienyl, lower alkynyl, lower cycloalkyl, lower cycloalkyl-lower alkyl, aryl, aryl-lower alkyl, aryl-lower alkenyl or aryl-lower alkynyl group and $R_2$ represents a lower alkyl, lower alkenyl or aryl group and acid addition salts thereof.

It will be appreciated that the term "lower" as used in this description and in the claims appended hereto means that the groups qualified thereby contain up to and including 7 carbon atoms. The lower alkyl, lower alkenyl, lower alkadienyl and lower alkynyl groups can be straight chain or branched chain groups. Examples of lower alkyl groups are methyl, ethyl, propyl, isopropyl, isobutyl, tertbutyl and amyl. Examples of lower alkenyl groups are vinyl, allyl and crotyl. The butadien-(1,3)-yl and pentadien-(1,3)-yl groups may be mentioned as examples of lower alkadienyl groups. Examples of lower alkynyl groups are propynyl and butynyl. The lower cycloalkyl group may be, for example, cyclopropyl, cyclobutyl or cyclohexyl and the lower cycloalkyl-lower alkyl group may be, for example, cyclopropylmethyl or cyclopentylmethyl. The term "aryl" when used alone or in combination such as in the term "aryl-lower alkyl" means phenyl and phenyl which carries one or more halo (i.e., chloro, bromo, iodo or fluoro), nitro, lower alkyl and/or lower alkoxy substituents; for example, p-chlorophenyl, 3,4-dichlorophenyl, o-tolyl, p-tolyl, p-methoxyphenyl and m-nitrophenyl. The benzyl, p-chlorobenzyl and β-phenylethyl groups may be mentioned as examples of aryl-lower alkyl groups, the cinnamyl group may be mentioned as an example of an aryl-lower alkenyl group and the phenyl-ethynyl and phenyl-propynyl groups may be mentioned as examples of aryl-lower alkynyl groups.

A preferred class of benzofuran derivatives provided by the invention comprises those compounds of formula I in which R represents an isopropyl or tertbutyl group, and acid addition salts thereof. With regard to S, this preferably represents a group of formula (a) hereinbefore in which $R_1$ represents a lower alkyl, lower alkenyl, aryl or aryl-lower alkenyl group. The substituent S is preferably present in the 5-position.

According to the process provided by the invention, the benzofuran derivatives aforesaid (that is to say, the compounds of formula I and their acid addition salts) are manufactured by reducing a halo-ketone of the general formula

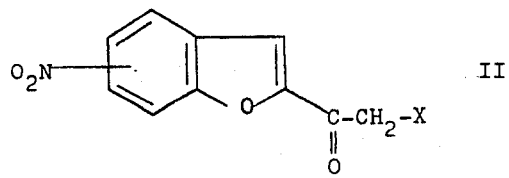

wherein X is chlorine or bromine with a reducing agent capable of reducing the keto group to a hydroxymethylene group without affecting the nitro group present and either reacting the resulting halohydrin of the general formula

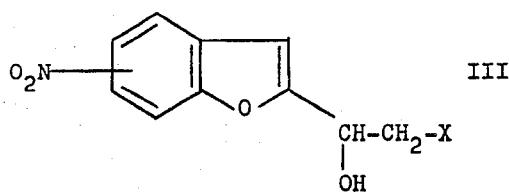

wherein X is as above
with an amine of the general formula $H_2N$-R    IV wherein R is as above
reducing the nitro group in the resulting compound of the general formula

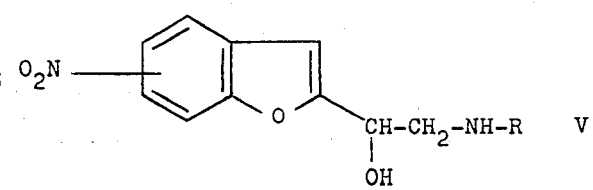

wherein R is as above
and appropriately acylating the amino group in the resulting compound of the general formula

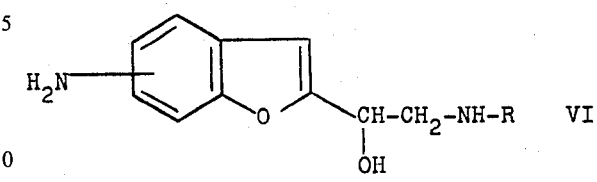

wherein R is as above
or, where a compound of formula I in which S represents a group of formula (a) in which $R_1$ represents a lower alkyl, lower cycloalkyl, lower cycloalkyl-lower alkyl, aryl or aryl-lower alkyl group or a grouping of formula (b) in which $R_2$ represents a lower alkyl or aryl group is required, reacting said halohydrin with an amine of the general formula

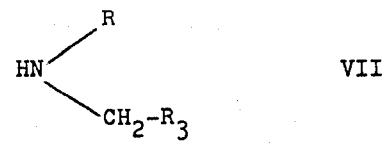

wherein R is as above and $R_3$ represents an aryl group reducing the nitro group in the resulting compound of the general formula

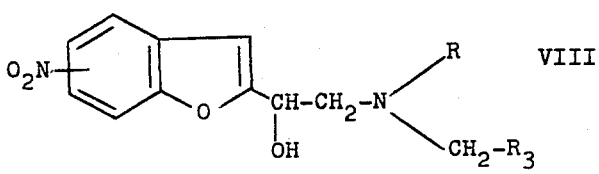

wherein R and R₃ are as above
with hydrogen in the presence of Raney nickel, appropriately acylating the amino group in the resulting compound of the general formula

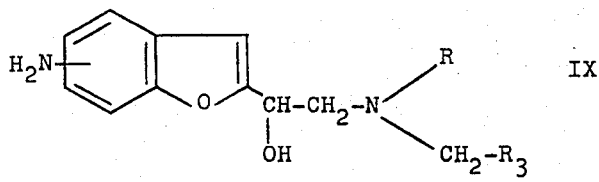

wherein R and R₃ are as above
and removing the aryl-methyl group —CH₂—R₃ from the resulting compound of the general formula

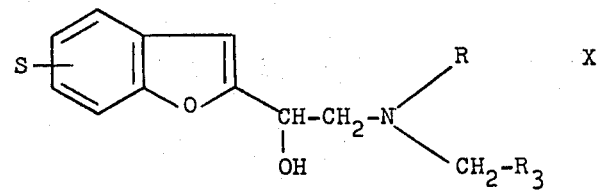

wherein R, R₃ and S are as above
by hydrogenolysis and, in either case if desired, converting the product obtained into an acid addition salt.

The halo-ketone starting materials of formula II hereinbefore can be prepared, for example, by reacting an appropriate nitro-substituted salicylaldehyde with chloro-acetone in the presence of an alkali-metal hydroxide (e.g., potassium hydroxide) in an inert organic solvent such as an alkanol containing up to 4 carbon atoms (e.g., ethanol) or in the presence of an anhydrous alkali-metal acetate (e.g., sodium acetate (e.g., sodium acetate) in an inert organic solvent such as a di(lower alkyl)ketone (e.g., methylethyl ketone) and chlorinating or brominating the resulting nitro-substituted 2-acetyl-benzofuran. The chlorination can conveniently be carried out by treatment with sulfuryl chloride and the bromination can conveniently be carried out by treatment with bromine in an inert organic solvent such as a di(lower alkyl)ether (e.g., diethyl ether), with cupric bromide in a mixture of ethyl acetate and chloroform or, preferably, with trimethylphenylammonium tribromide in a suitable inert organic solvent (e.g., tetrahydrofuran). Preferred halo-ketone starting materials of formula II are those in which the nitro group is present in the 5-position.

The reduction of a halo-ketone of formula II is conveniently carried out using an alkali-metal borohydride (preferably sodium borohydride). The reduction is suitably carried out in an inert solvent such as an alkanol containing up to 4 carbon atoms (e.g., ethanol) or aqueous dioxane, in which the chloro-ketone of formula II is advantageously suspended or dissolved prior to the treatment with the alkali-metal borohydride. It is preferred to carry out the reduction with an alkali-metal borohydride at room temperature or at a temperature below room temperature and at normal pressure. The reduction can also be carried out using aluminum isopropoxide in isopropanol, preferably at a temperature of 80°-90°C.

The reaction of a halohydrin of formula III with an amine of formula IV in accordance with one embodiment of the foregoing process is conveniently carried out using at least one molar proportion of the amine. The reaction is conveniently carried out in the presence of an acid binding agent, examples of which are alkali-metal carbonates (e.g., sodium carbonate), tertiary organic amines (e.g., pyridine) or, preferably, an excess of an amine of formula IV. Accordingly, the reaction is preferably carried out using at least two molar proportions of an amine of formula IV. The reaction can be carried out in the presence of an inert organic solvent (e.g., an alkanol containing up to 4 carbon atoms such as ethanol) but, except where solution of the acid binding agent is required, this is not essential. It is preferred to carry out the reaction at an elevated temperature; for example, at a temperature of from 50°C. up to the reflux temperature of the reaction mixture, preferably at the reflux temperature. It may also be advantageous to carry out the reaction in a closed vessel at about 100°C. A particularly preferred amine of formula IV is isopropylamine or tertbutylamine.

The reduction of the nitro group in a compound of formula V is suitably carried out using hydrogen in the presence of a noble metal catalyst such as platinum or palladium catalyst (e.g., platinum oxide or palladium-on-charcoal), although other catalysts such as Raney nickel can also be used. A palladium catalyst, especially palladium-on-charcoal, is preferred. The catalytic hydrogenation can suitably be carried out in an inert organic solvent such as an alkanol containing up to 4 carbon atoms (e.g., ethanol). It is preferred to carry out the catalytic hydrogenation at room temperature and atmospheric pressure, although it may be carried out at higher or lower temperatures and/or pressures.

The acylation of the amino group in a compound of formula VI obtained by the foregoing hydrogenation to yield a compound of formula I in which S denotes a grouping of formula (a) or (b) can be carried out according to known acylation techniques using mild conditions (e.g., a temperature between 0°C. and 25°C.), whereby only the amino group present in the 4-, 5-, 6- or 7-position of the molecule is acylated. A suitable acylating agent is an appropriate acid halide or acid anhydride. According to a preferred aspect, the acylation is carried out using an acid anhydride (e.g., acetic anhydride or propionic acid anhydride) under acidic conditions which may suitably be provided by dilute hydrochloric acid. It is also preferred to lower alkanoylate, lower alkenoylate, aroylate or aryl-(lower alkenoylate), the amino group in a compound of formula VI.

The reaction of a halohydrin of formula III with an amine of formula VII in accordance with a second embodiment of the foregoing process can be carried out under the conditions described earlier in connection with the reaction of a halohydrin with an amine of formula IV. A preferred amine of formula VI is one in which R represents an isopropyl or tertbutyl group, especially N-benzylisopropylamine.

The reduction of the nitro group in a compound of formula VIII using hydrogen in the presence of Raney nickel can suitably be carried out at room temperature and atmospheric pressure and in the presence of an inert organic solvent such as ethanol.

The amino group in a compound of formula IX thus obtained is then acylated in the same manner as described earlier in connection with the acylation of the amino group in a compound of formula VI to yield a compound of formula X.

The removal of the aryl-methyl group —$CH_2$—$R_3$ from a compound of formula X by hydrogenolysis can conveniently be carried out using hydrogen in the presence of a noble metal catalyst such as a palladium catalyst, especially palladium-on-charcoal. This catalytic hydrogenation may be carried out in an inert organic solvent (e.g., a lower alkanol such as ethanol). Although it is preferred to carry out this catalytic hydrogenation at room temperature and atmospheric pressure, elevated or reduced temperatures and/or pressures may be used if so desired. It will be appreciated that, during this hydrogenolysis, not only will the aryl-methyl group be removed, but also any lower alkenyl, lower alkadienyl, lower alkynyl, aryl-lower alkenyl or aryl-lower alkynyl group denoted by $S_1$ in a compound of formula X will be reduced to the corresponding lower alkyl or aryl-lower alkyl group as the case may be.

According to a modification of the foregoing process, a compound of formula V is prepared by oxidizing a compound of the general formula

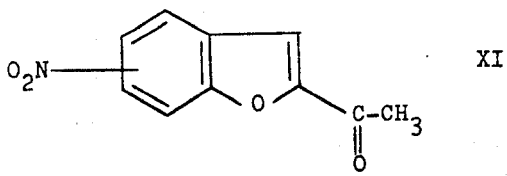

XI with selenium dioxide and treating the resulting compound of the general formula

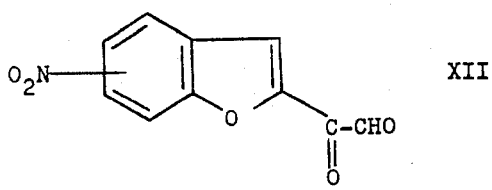

XII with an amine of formula IV in the presence of an alkali metal borohydride.

The oxidation of a compound of formula XI with selenium dioxide is conveniently carried out in an inert organic solvent, preferably a high-boiling cyclic ether such as dioxane or a mixture thereof with water, and at an elevated temperature, suitably at or near the reflux temperature of the mixture.

The treatment of a compound of formula XII with an amine of formula IV in the presence of an alkali metal borohydride, preferably sodium borohydride, is suitably carried out in an inert organic solvent, preferably an alcohol containing up to 4 carbon atoms such as methanol or ethanol. It is preferred to carry out this treatment at a temperature of from 20°–25°C.

According to a further modification of the foregoing process, a halohydrin of formula III is dehydrohalogenated and the resulting epoxide of the general formula

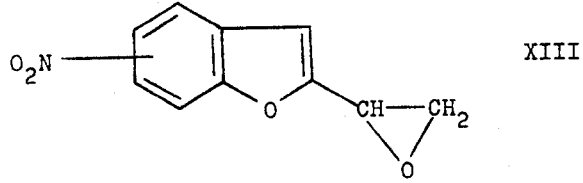

XIII is treated with an amine of formula IV or VII to give a compound of formula V or VIII respectively.

The dehydrohalogenation of a halohydrin of formula III can be carried out according to known methods. A preferred dehydrohalogenation method comprises treating a solution of a halohydrin of formula III in an inert organic solvent (e.g., an alkanol containing up to 4 carbon atoms such as methanol or ethanol) with an alkali metal hydroxide (e.g., sodium hydroxide or potassium hydroxide, preferably sodium hydroxide) at a temperature between 0°C. and 10°C. The halohydrin of formula III can be dehydrohalogenated in situ; that is to say, without isolation from the medium in which it is prepared.

The treatment of an epoxide of formula XIII with an amine of formula IV (especially isopropylamine or tert-butylamine) or formula VII (especially N-benzylisopropylamine) can be carried out in an inert organic solvent (e.g., an alkanol containing up to 4 carbon atoms such as methanol or ethanol or a mixture of an alkanol containing up to 4 carbon atoms with an aromatic hydrocarbon such as benzene). The treatment is advantageously carried out at an elevated temperature (e.g., at a temperature at or near the reflux temperature of the mixture).

According to yet a further modification of the foregoing process, a compound of formula VI is prepared by catalytically hydrogenating a compound of formula VIII in the presence of a palladium group metal catalyst.

The catalytic hydrogenation of a compound of formula VIII can suitably be carried out in an inert organic solvent (e.g., an alkanol containing up to 4 carbon atoms such as methanol or ethanol). Suitable catalysts include palladium, platinum and rhodium which may be supported on a carrier material (e.g., palladium-on-charcoal, rhodium-on-alumina, etc.). A preferred catalyst is palladium, especially palladium-on-charcoal. The catalytic hydrogenation is preferably carried out at room temperature and atmospheric pressure although it may be carried out at higher temperatures and/or pressures if desired. It may be advantageous to include in the catalytic hydrogenation mixture a small amount of a strong acid such as perchloric acid.

It will be appreciated that the compounds of formula I contain an asymmetric carbon atom and can occur in the form of a stereoisomeric racemate. A racemate can, if desired, be resolved into its optical isomers according to methods known per se: for example, by fractional crystallization of the salts with optically active acids. Furthermore, a racemate of formula V, VI, VIII, IX or X hereinbefore can be separated into its optical isomers in the same manner.

The compounds of formula I hereinbefore can be converted into their acid addition salts by treatment with inorganic and organic acids; for example, hydrohalic acids such as hydrochloric acid an hydrobromic acid, sulfuric acid, phosphoric acid, cyclohexane sulfamic acid, acetic acid, tartaric acid, maleic acid, fumaric acid, citric acid and toluenesulfonic acids. The pharmaceutically acceptable acid addition salts are preferred.

The benzofuran derivatives provided by the present invention have been shown in tests carried out on mice and guinea pigs to possess β-adrenergic blocking activity. A particular advantage of the present benzofuran derivatives lies in the fact that in animal tests they have a selective β-adrenergic blocking activity, being active on the β-receptor sites of the heart while having no action or only a slight action of the β-receptor sites of the lung.

The compounds of formula I and their pharmaceutically acceptable acid addition salts may accordingly be useful in human medicine for the prophylaxis and treatment of diseases of the heart such as, for example, angina pectoris and cardiac arrhythmias.

The compounds of formula I and their pharmaceutically acceptable acid addition salts have a relatively low toxicity compared with the dosage required to produce the desired β-adrenergic blocking effect. For example, the $LD_{50}$ in mice of 5-acetamido-2-(1-hydroxy-2-isopropylamino)-benzofuran and 2-(1-hydroxy-2-isopropylamino)-5-cinnamido-benzofuran is 200–800 mg/kg i.p. and 400–1600 mg/kg i.p. respectively while they show in mice a 50% reduction in isoprenaline-induced tachycardia at 1.0 mg. and 0.24 mg/kg respectively.

The compounds of formula I and their pharmaceutically acceptable acid addition salts can be used as medicaments in the form of pharmaceutical preparations which contain them in association with a compatible pharmaceutical carrier. This carrier can be a solid or liquid organic or inorganic carrier which is suitable for enteral (e.g., oral) or parenteral administration. Examples of such carriers are water, gelatin, starch, talc, magnesium stearate, vegetable oils, petroleum jelly and polyalkyleneglycols. The pharmaceutical preparations may be made up in solid dosage forms (e.g., tablets, suppositories or capsules) or in liquid dosage forms (e.g., solutions, suspensions or emulsions), which may be sterilized and/or which may contain customary additives such as preserving agents, wetting agents, stabilizing agents, buffers or salts for altering the osmotic pressure.

The following examples illustrate the process provided by the invention.

EXAMPLE 1

A mixture of 130 g. (0.78 mol) of 5-nitro-salicylaldehyde, 104 g. (1.25 mol) of anhydrous sodium acetate and 234 g. (2.5 mol) of chloro-acetone in 1,300 ml. of methyl ethyl ketone was heated under reflux, with stirring, for 24 hours. After cooling, the resulting mixture was filtered and the filtrate evaporated to dryness under reduced pressure. The evaporation residue was combined with the filter cake and partitioned between methylene chloride and water. The organic phase was separated off, washed successively with dilute sodium hydroxide solution, water and saturated brine, dried over anhydrous sodium sulfate, filtered and evaporated under reduced pressure. The solid residue was crystallized from chloroform/ethanol (70:30) to yield 100.1 g. of 2-acetyl-5-nitro-benzofuran as a pale yellow solid of melting point 172°–174°C.

A stirred solution of 100 g. (0.49 mol) of 2-acetyl-5-nitro-benzofuran in 1,600 ml. of chloroform was treated dropwise at room temperature with 44 ml. (73 g., 0.54 mol) of sulfuryl chloride. The resulting mixture was warmed to reflux and stirred under reflux conditions for 3 hours, then poured onto 3 liters of ice/water with stirring. The organic phase was separated off, washed successively with water, sodium carbonate solution, water and saturated brine, dried over anhydrous sodium sulfate, filtered and evaporated to dryness under reduced pressure. The residual solid was crystallized from ethanol/chloroform (60:40) to yield 95.5 g. of 2-chloroacetyl-5-nitro-benzofuran as a yellow solid of melting point 127°–128°C.

A stirred suspension of 92.0 g. (0.39 mol) of 2-chloroacetyl-5-nitro-benzofuran in 1,600 ml. of 80% aqueous dioxane was treated portionwise at room temperature over a period of 0.5 hour with 8.0 g. (0.21 mol) of sodium borohydride. The resulting mixture was stirred overnight, then dioxane was evaporated off under reduced pressure and the residue was diluted with water and extracted with chloroform. The chloroform solution was washed with water and with saturated brine, dried over anhydrous sodium sulfate, filtered and evaporated under reduced pressure to yield 93 g. of crude 2-(2-chloro-1-hydroxy-ethyl)-5-nitro-benzofuran as a brown viscous gum.

90.0 G. of crude 2-(2-chloro-1-hydroxy-ethyl)-5-nitro-benzofuran were heated under reflux for 48 hours with 203.0 g. of isopropylamine in 1,400 ml. of ethanol. After cooling, the resulting mixture was evaporated to dryness under reduced pressure and the residual gum was partitioned between dilute sodium hydroxide solution and ethyl acetate. The ethyl acetate layer was separated off and extracted twice with dilute hydrochloric acid. The combined acidic extracts were washed once with ethyl acetate, then basified with dilute sodium hydroxide solution and extracted twice with ethyl acetate. The combined ethyl acetate extracts were washed with water and with saturated brine, dried over anhydrous sodium sulfate, filtered and evaporated to dryness under reduced pressure. The residual solid was crystallized from ethyl acetate to yield 38 g. of 2-(1-hydroxy-2-isopropylamino-ethyl)-5-nitro-benzofuran as a buff solid of melting point 133°–134°C.

33.2 G. (0.125 mol) of 2-(1-hydroxy-2-isopropylamino-ethyl)-5-nitro-benzofuran were suspended in 500 ml. of ethanol and hydrogenated at room temperature and atmospheric pressure in the presence of 3.3 g. of 5% palladium-on-charcoal until there was no further uptake of hydrogen (3 mol equivalents of hydrogen were absorbed). The catalyst was subsequently filtered off and the filtrate was evaporated to dryness under reduced pressure. The residual solid was crystallized from ethyl acetate to yield 28.1 g. of 2-(1-hydroxy-2-isopropylamino-ethyl)-5-amino-benzofuran as a buff solid of melting point 126°C. The corresponding monohydrochloride has a melting point of 200°–202°C.

A stirred solution of 5.0 g. (0.023 mol) of 2-(1-hydroxy-2-isopropylamino-ethyl)-5-amino-benzofuran in 36 ml. of water and 14.3 ml. of 2N hydrochloric acid was treated at room temperature with 3.3 g. (0.025 mol) of propionic anhydride. The resulting mixture was stirred for 0.5 hour, then 10 ml. of ether were added and the mixture was shaken. The lower aqueous layer was separated off and basified with dilute sodium hydroxide solution. The precipitated solid was filtered off, washed with water, dried and recrystallized from ethyl acetate to yield 4.1 g. of 2-(1-hydroxy-2-isopropylamino-ethyl)-5-propionamido-benzofuran as a buff solid of melting point 180°–181°C. The corresponding cyclohexanesulfamate has a melting point of 150°–151°C. (from ethanol).

In a manner analogous to the foregoing, from 2-(1-hydroxy-2-isopropylamino-ethyl)-5-amino-benzofuran there were also obtained 2-(1-hydroxy-2- isopropylamino-ethyl)-5-isobutyramido-benzofuran (melting point = 160°–162°C.); 2-(1-hydroxy-2-isopropylaminoethyl)-5-valeramido-benzofuran (melting point = 135°–138°C.); 2-(1-hydroxy-2-isopropylamino-ethyl)-5-crotonamido-benzofuran (melting point = 148°–150°C.); 2-(1-hydroxy-2-isopropylaminoethyl)-5-butyramido-benzofuran (melting point = 147°–149°C.); 2-(1-hydroxy-2-isopropylamino-ethyl)-5-cyclobutanecarboxamidobenzofuran (melting point = 165°–168°C.); 2-(1-hydroxy-2-isopropylamino-ethyl)-5-cyclopropanecarboxamido-benzofuran (melting point = 195°–196°C.); 2-(1-hydroxy-2-isopropylamino-ethyl)-5-cinnamido-benzofuran (melting point = 190°–192°C.); 2-(1-hydroxy-2-isopropylamino-ethyl)-5-benzamido-benzofuran (melting point = 181°–182°C.); 2-(1-hydroxy-2-isopropylamino-ethyl)-5-(1-cyclopentyl-acetamido)-benzofuran (melting point = 167°–168°C.); 2-(1-hydroxy- 2-isopropylamino-ethyl)-5-(1-ethyl-butyramido)-benzofuran (melting point = 156°–158°C.); 2-(1-hydroxy-2-isopropylamino-ethyl)-5-(β,β-dimethyl-acrylamido)-benzofuran (melting point of the cyclohexanesulfamate = 116°–118°C.); 2-(1-hydroxy-2-isopropylamino-ethyl)-5-(3-phenyl-propionamido)-benzofuran (melting point = 150°–152°C.); 2-(1-hydroxy-2-isopropylaminoethyl)-5-(hex-5-ynamido)-benzofuran (melting point = 125°–127°C.); and 2-(1-hydroxy-2-isopropylamino-ethyl)-5-sorbamido-benzofuran (melting point = 154°–156°C.).

EXAMPLE 2

4.8 g. of 2-(2-chloro-1-hydroxy-ethyl)-5-nitro-benzofuran (prepared as described in Example 1) and 14.6 g. of tertbutylamine were heated at reflux for 48 hours in ethanol. The resulting mixture was worked up as described in Example 1 to yield 2.8 g. of 2-(1-hydroxy-2-tertbutylamino-ethyl)-5-nitro-benzofuran as off-white crystals of melting point 118°–120°C. (from ethyl acetate).

2.6 g. of 2-(1-hydroxy-2-tertbutylamino-ethyl)-5-nitro-benzofuran in 75 ml. of ethanol were hydrogenated in the presence of 0.2 g. of 5% palladium-on-charcoal and the resulting mixture was worked up as described in Example 1 to yield 2.4 g. of 2-(1-hydroxy-2-tertbutylamino-ethyl)-5-amino-benzofuran as a yellow solid of melting point 144°–146°C.

A solution of 2.4 g. of 2-(1-hydroxy-2-tertbutylamino-ethyl)-5-amino-benzofuran in 16 ml. of water and 5.6 ml. of 2N hydrochloric acid was treated at room temperature with 1.29 g. of propionic anhydride. The resulting mixture was worked up as described in Example 1 to yield 1.1 g. of 2-(1-hydroxy-2-tertbutylamino-ethyl)-5-propionamido-benzofuran which melted at 120°–122°C. after recrystallization from a mixture of benzene and petroleum ether (boiling range = 60°–80°C.).

EXAMPLE 3

By reaction of 25.9 g. (0.155 mol) of 4-nitro-salicylaldehyde, with 21.5 g. of anhydrous sodium acetate and 46.0 g. of chloro-acetone in 260 ml. of methyl ethyl ketone in a manner analogous to that described in Example 1, 8.6 g. of 2-acetyl-6-nitro-benzofuran were obtained in the form of a buff solid of melting point 144°–145°C. after recrystallization from ethanol/chloroform (50:50). Treatment of a solution of 8.6 g. (0.0042 mol) of 2-acetyl-6-nitro-benzofuran in 130 ml. of chloroform with 3.7 ml. (2.2 g.) of sulfuryl chloride in a manner analogous to that described in Example 1 yielded 8.0 g. of 2-chloroacetyl-6-nitro-benzofuran of melting point 149°–151°C. (from ethanol).

By treatment of a solution of 8.0 g. (0.033 mol) of 2-chloroacetyl-6-nitro-benzofuran in 150 ml. of aqueous dioxane with 0.7 g. of sodium borohydride in a manner analogous to that described in Example 1, there were obtained 8.0 g. of crude 2-(2-chloro-1-hydroxy-ethyl)-6-nitro-benzofuran in the form of a brown oil.

8.0 g. of crude 2-(2-chloro-1-hydroxy-ethyl)-6-nitrobenzofuran were reacted with 24 g. of isopropylamine in 70 ml. of ethanol in a manner analogous to that described in Example 1 to yield 2.0 g. of 2-(1-hydroxy-2-isopropylamino-ethyl)-6-nitro-benzofuran of melting point 130°–131°C. (from ethyl acetate).

1.8 g. of 2-(1-hydroxy-2-isopropylamino-ethyl)-6-nitro-benzofuran suspended in 50 ml. of ethanol were hydrogenated in the presence of 0.2 g. of 5% palladium-on-charcoal in a manner analogous to that described in Example 1 and 1.5 g. of the crude 2-(1-hydroxy-2-isopropylamino-ethyl)-6-amino-benzofuran thus obtained were dissolved in 7 ml. of water and 2.7 ml. of 2N hydrochloric acid and treated with 1.0 g. of propionic anhydride. Working up in a manner analogous to that described in Example 1 yielded 1.3 g. of 2-(1-hydroxy-2-isopropylaminoethyl)-6-propionamido-benzofuran as buff crystals of melting point 146°–147°C. (from ethyl acetate).

EXAMPLE 4

25 g. (0.15 mol) of 3-nitro-salicylaldehyde were reacted with 25 ml. of chloro-acetone in the presence of 10 g. of potassium hydroxide in 475 ml. of ethanol. The resulting mixture was worked up in a manner analogous to that described in Example 1 to yield 9.0 g. of 2-acetyl-7-nitro-benzofuran as brown crystals of melting point 141°–143°C.

A solution of 9.0 g. of 2-acetyl-7-nitro-benzofuran in 50 ml. of chloroform was treated with 4 ml. of sulfuryl chloride in a manner analogous to that described in Example 1 to yield 7.1 g. of 2-chloroacetyl-7-nitro-benzofuran of melting point 105°C. after crystallization from a mixture of benzene and petroleum ether (boiling range = 40°–60°C.).

Treatment of a solution of 7.1 g. of 2-chloroacetyl-7-nitro-benzofuran in 60 ml. of 80% aqueous dioxane with 0.8 g. of sodium borohydride in a manner analogous to that described in Example 1 yielded 7.1 g. of crude 2-(2-chloro-1-hydroxy-ethyl)-7-nitro-benzofuran as a dark oil.

7.1 g. of crude 2-(2-chloro-1-hydroxy-ethyl)-7-nitro-benzofuran and 26 ml. of isopropylamine in 100 ml. of ethanol were heated at reflux for 92 hours. The resulting mixture was worked up in a manner analogous to that described in Example 1 to yield 1.3 g. of 2-(1-hydroxy-2-isopropylamino-ethyl)-7-nitro-benzofuran as a buff solid of melting point 116°–117°C. after crystallization from a mixture of benzene and petroleum ether (boiling range = 40°–60°C.).

A suspension of 1.3 g. of 2-(1-hydroxy-2-isopropylaminoethyl)-7-nitro-benzofuran in 100 ml. of ethanol was hydrogenated in the presence of 0.1 g. of 5% palladium-on-charcoal in a manner analogous to that described in Example 1 to yield 0.6 g. of 2-(1-hydroxy-2-isopropylamino-ethyl)-7-amino-benzofuran of melting point 121°C. after crystallization from a mixture of benzene and petroleum ether (boiling range = 40°–60°C.).

A solution of 0.58 g. of 2-(1-hydroxy-2-isopropylaminoethyl)-7-amino-benzofuran in 4 ml. of water and 1.6 ml. of 2N hydrochloric acid was treated with 0.3 ml. of acetic anhydride and the resulting mixture was worked up in a manner analogous to that described in Example 1 to yield 0.2 g. of 2-(1-hydroxy-2-isopropylamino-ethyl)-7-acetamido-benzofuran of melting point 102°–105°C. (from ethyl acetate).

EXAMPLE 5

A stirred solution of 16.0 g. (0.078 mol) of 2-acetyl-5-nitro-benzofuran (prepared as described in Example 1) in 300 ml. of dry tetrahydrofuran was treated at room temperature with 29.5 g. (0.078 mol) of trimethyl-phenyl-ammonium tribromide in one portion. After 2.5 hours, the white crystalline precipitate of trimethyl-phenyl-ammonium bromide was filtered off and the filtrate was diluted with 350 ml. of water and extracted with ether. The extracts were washed successively with sodium hydrogen carbonate solution, water and brine, dried over anhydrous sodium sulfate, filtered and evaporated under reduced pressure to leave 20.0 g. of 2-bromoacetyl-5-nitro-benzofuran as a yellow solid of melting point 110°–112°C.

A stirred solution of 20.0 g. (0.074 mol) of 2-bromoacetyl-5-nitro-benzofuran in 150 ml. of dioxane was treated at room temperature with a solution of 1.95 g. (0.05 mol) of sodium borohydride in 30 ml. of water. The resulting mixture was stirred for 3 hours, then dioxane was evaporated off under reduced pressure and the residue was diluted with water and extracted twice with ether. The combined ether extracts were washed with water and with saturated brine, dried over anhydrous sodium sulfate, filtered and evaporated under reduced pressure to leave 20.0 g. of 2-(2-bromo-1-hydroxy-ethyl)-5-nitro-benzofuran as an amber oil.

A solution of 20.0 g. (0.07 mol) of 2-(2-bromo-1-hydroxyethyl)-5-nitro-benzofuran in 150 ml. of ethanol was treated with 19.8 g. (0.0126 mol) of N-benzyl-N-isopropylamine and the resulting solution was heated at 100°C. in an autoclave for 144 hours. After cooling, the resulting mixture was evaporated to dryness and the residue was treated with ether. The precipitated N-benzyl-N-isopropylamine hydrochloride was filtered off and unchanged N-benzyl-N-isopropylamine was distilled from the filtrate at 70°–80°C./0.6 mm. The distillation residue was dissolved in ethanol and the solution was treated with ethanolic hydrogen chloride to yield 5.0 g. of 2-[1-hydroxy-2-(N-benzyl-N-isopropylamino)-ethyl]-5-nitro-benzofuran hydrochloride of melting point 187°–191°C.

3.6 g. (0.00922 mol) of 2-[1-hydroxy-2-(N-benzyl-N-isopropylamino)-ethyl]-5-nitro-benzofuran were hydrogenated at room temperature and atmospheric pressure in 100 ml. of ethanol in the presence of 1.5 ml. of Raney nickel until three molar equivalents of hydrogen had been absorbed (4 days). The catalyst was subsequently filtered off and the filtrate was evaporated to dryness. The residue was treated with dilute sodium hydroxide solution and extracted twice with chloroform. The combined chloroform extracts were washed with water and with brine, dried over anhydrous sodium sulfate, filtered and evaporated to yield 2.0 g. of crude 2-[1-hydroxy-2-(N-benzyl-N-isopropylamino)-ethyl]-5-amino-benzofuran as an oil.

2.0 g. of crude 2-[1-hydroxy-2-(N-benzyl-N-isopropylamino)-ethyl]-5-amino-benzofuran were warmed with 20 ml. of acetic anhydride for 0.5 hour. The resulting solution was poured into sodium carbonate solution and the mixture was extracted with ethyl acetate. The ethyl acetate extract was washed with water and with brine, dried over anhydrous sodium sulfate, filtered and evaporated to dryness under reduced pressure. The residual amber gum, 2-[1-acetoxy-2-(N-benzyl-N-isopropylamino)-ethyl]-5-acetamido-benzofuran, was stirred in 50 ml. of ethanol with 0.35 g. of potassium hydroxide for 0.75 hour. The ethanol was subsequently evaporated off under reduced pressure and the residue was treated with water and extracted with ether. The ether extract was washed with water and with saturated brine, dried over anhydrous sodium sulfate, filtered and evaporated to yield 1.5 g. of 2-[1-hydroxy-2-(N-benzyl-N-isopropylamino)-ethyl]-5-acetamido-benzofuran as an oil.

1.5 g. (0.004 mol) of 2-[1-hydroxy-2-(N-benzyl-N-isopropylamino)-ethyl]-5-acetamido-benzofuran in 30 ml. of ethanol were hydrogenated at room temperature and atmospheric pressure in the presence of 0.25 g. of 5% palladium-on-charcoal. After the absorption of one molar equivalent of hydrogen (2 hours), the catalyst was filtered off, the filtrate was evaporated under reduced pressure and the residual gum was crystallized from ethyl acetate to yield 0.4 g. of 2-(1-hydroxy-2-isopropylaminoethyl)-5-acetamido-benzofuran as a pink solid of melting point 127°–128°C.

EXAMPLE 6

980 mg. of 2-(1-hydroxy-2-isopropylamino-ethyl)-5-aminobenzofuran (prepared as described in Example 1), 980 mg. of paratoluenesulfonic acid, 0.35 ml. of acetic acid and 20 ml. of water were heated together until the paratoluenesulfonic acid melted. The resulting mixture was then shaken at room temperature for 0.5 hour, carefully basified to pH 11 and extracted with ethyl acetate. The extract was washed with water and with brine, dried over anhydrous sodium sulfate and evaporated under reduced pressure. The residue was chromatographed on silica gel using chloroform as the eluant to yield pure 2-(1-hydroxy-2-isopropylamino-ethyl)-5-paratoluenesulfonamido-benzofuran. This was dissolved in ethanol and the solution was treated with an ethanolic solution of oxalic acid. The resulting mixture was treated with ether and the resulting precipitate was filtered off and recrystallized from ethanol/ether to yield 500 mg. of 2-(1-hydroxy-2-isopropylamino-ethyl)-5-paratoluenesulfonamido-benzofuran neutral oxalate of melting point 247°–250°C.

In a manner analogous to that described in the preceding paragraph there was prepared 2-(1-hydroxy-2-isopropylamino-ethyl)-5-benzenesulfonamido-benzofuran of melting point 168°–170°C.

EXAMPLE 7

In a manner analogous to that described in Example 2, 2-(1-hydroxy-2-isobutylamino-ethyl)-5-butyramido-benzofuran (melting point = 124°–126°C.) was prepared from 2-(2-chloro-1-hydroxy-ethyl)-5-nitro-benzofuran via 2-(1-hydroxy-2-isobutylamino-ethyl)-5-nitro-benzofuran (melting point = 123°–124°C.) and 2-(1-hydroxy-2-isobutylamino-ethyl)-5-amino-benzofuran (melting point = 95°–96°C.).

EXAMPLE 8

In a manner analogous to that described in Example 2, 2-(1-hydroxy-2-secbutylamino-ethyl)-5-(p-chlorobenzamido)-benzofuran (melting point = 155°C.) was prepared from 2-(2-chloro-1-hydroxyethyl)-5-nitro-benzofuran via 2-(1-hydroxy-2-secbutylamino-ethyl)-5-nitro-benzofuran (melting point = 95°–96°C.) and 2-(1-hydroxy-2-secbutylamino-ethyl)-5-amino-benzofuran (melting point = 180°–183°C.).

EXAMPLE 9

1.0 g. of sodium borohydride was added portionwise at 10°–15°C. over a period of 0.25 hour to a stirred suspension of 12.0 g. of 2-chloroacetyl-5-nitro-benzofuran (prepared as described in Example 1) in 200 ml. of methanol. The mixture was allowed to warm to 20°–25°C. and was then stirred for a further 3 hours in order to complete the reduction. The solution, containing the 2-(2-chloro-1-hydroxy-ethyl)-5-nitro-benzofuran, was then cooled to 0°C. and treated dropwise over a period of 0.5 hour with a solution of 1 g. of sodium hydroxide in 25 ml. of methanol. The mixture was allowed to stand for a further 0.5 hour at 0°C. and then left to stand at 0°C. overnight. The mixture was then poured into 600 ml. of water and stirred at 20°–25°C. for 0.5 hour. The solid product was filtered off, washed with 60 ml. of methanol/water (1:5) and dried to yield 8.0 g. of 2-epoxy-ethyl-5-nitro-benzofuran of melting point 124°–126°C. This product may be recrystallized from benzene if desired.

A solution of 41.2 g. of 2-epoxyethyl-5-nitro-benzofuran in 250 ml. of methanol/benzene (1:1) was heated under reflux for 40 hours with 72.0 g. of isopropylamine. The mixture was then cooled to 25°C. and the solvent was removed by evaporation under reduced pressure. The residual solid was partitioned between dilute hydrochloric acid and ethyl acetate. The aqueous-acidic solution was separated off, made basic with dilute sodium hydroxide solution and, after cooling, the precipitated solid was filtered off, washed with water and dried. The combined filtrate and washings were extracted twice with ethyl acetate, the extracts were washed with water, dried over anhydrous sodium sulfate and evaporated under reduced pressure. The solid residue was combined with the precipitated solid referred to earlier and crystallized from ethyl acetate to give 35.0 g. of 2-(1-hydroxy-2-isopropylamino-ethyl)-5-nitro-benzofuran of melting point 133°–134°C. which was then further processed in the manner described in Example 1.

EXAMPLE 10

19.0 g. of 2-[1-hydroxy-2-(N-benzyl-N-isopropylamino)-ethyl]-5-nitro-benzofuran (prepared as described in Example 5) were dissolved in 500 ml. of methanol and 20 drops of 15% aqueous perchloric acid were added. The mixture was hydrogenated over 2.0 g. of 5% palladium-on-charcoal until four molar equivalents of hydrogen had been absorbed (1.5 hours). The catalyst was filtered off, the filtrate evaporated to dryness under reduced pressure and the residual solid partitioned between dilute sodium hydroxide solution and ethyl acetate. The phases were separated, the organic phase was washed with water and with saturated brine, dried over anhydrous sodium sulfate and evaporated under reduced pressure. The residual solid was crystallized from ethyl acetate to give 9.4 g. of 2-(1-hydroxy-2-isopropylamino-ethyl)-5-aminobenzofuran of melting point 125°–128°C. which was then further processed in the manner described in Example 1.

EXAMPLE 11

A solution of 8.3 g. of senenium dioxide in 30 ml. of dioxane/water (3:1) was added at 60°C. to a stirred solution of 10.2 g. of 5-nitro-2-acetyl-benzofuran in 60 ml. of dioxane. The mixture was heated under reflux for 18 hours, filtered while hot and allowed to cool. The cooled mixture was diluted with water and extracted with ethyl acetate. The extracts were washed with water and brine, dried over anhydrous sodium sulfate and evaporated to give a yellow semi-solid. Trituration with ether gave 5-nitro-2-benzofuranylglyoxal as a yellow powder of melting point 176°–178°C.

1.0 g. of sodium borohydride was added portionwise over a period of 0.5 hour to a stirred solution of 4.4 g. of 5-nitro-2-benzofuranylglyoxal in 50 ml. of methanol and 10 ml. of isopropylamine. The mixture was stirred overnight at 20°–25°C., then evaporated under reduced pressure and the residual oil partitioned between dilute hydrocholoric acid and ethyl acetate. The phases were separated and the aqueous-acidic phase was made basic with dilute sodium hydroxide solution. The alkaline solution obtained was extracted twice with ethyl acetate, the combined ethyl acetate extracts were washed with water and brine, dried over anhydrous sodium sulfate and evaporated under reduced pressure. The residual solid was crystallized from ethyl acetate to give 1.0 g. of the desired 2-(1-hydroxy-2-isopropylamino-ethyl)-5-nitro-benzofuran of melting point 123°C. which was further processed in the manner described in Example 1.

EXAMPLE 12

By the treatment of amounts of (±)-2-(1-hydroxy-2-isopropylamino-ethyl)-5-nitro-benzofuran (prepared as described in Example 1) and (+)- and (−)-dibenzoyl-tartaric acid followed by fractional crystallization of the resulting salts from methanol to constant melting point and specific rotation, conversion of the individual salts into the respective free bases and crystallization thereof from ethyl acetate there were obtained (+)-2-(1-hydroxy-2-isopropylamino-ethyl)-5-nitro-benzofuran of melting point 144°–146°C. and $[\alpha]^{20}_{436} = +53.4°$ ($c = 0.5\%$ in methanol) and (−)-2-(1-hydroxy-2-isopropylamino-ethyl)-5-nitrobenzofuran of melting point 144°–146°C. and $[\alpha]^{20}_{436} = −51.7°$ ($c = 0.5\%$ in methanol).

Each of the foregoing optical isomers was hydrogenated in the manner described in Example 1 and the desired 5-amino compounds were isolated by crystallization from ethyl acetate. There were obtained (+)-2-(1-hydroxy-2-isopropylamino-ethyl)-5-aminobenzofuran of melting point 104°–105°C. and $[\alpha]^{20}_{436} = +61.5°$ ($c = 0.5\%$ in methanol) and (−)-2-(1-hydroxy-2-isopropylaminoethyl)-5-amino-benzofuran of melting point 104°–105°C. and $[\alpha]^{20}_{436} = −62°$ ($c = 0.5\%$ in methanol).

Each of the foregoing optical isomers was acylated with propionic anhydride in the manner described in Example 1 to give (+)-2-(1-hydroxy-2-isopropylamino-ethyl)-5-propionamido-benzofuran of melting point 142°C. and $[\alpha]^{20}_{436} = +40.4°$ ($c = 0.5\%$ in methanol) and (−)-2-(1-hydroxy-2-isopropylamino-ethyl)-5-propionamido-benzofuran of melting point 142°–143°C. and $[\alpha]^{20}_{436} = -41.2°$ ($c = 0.5\%$ in methanol).

EXAMPLE 13

A mixture of 41.0 g. of 2-epoxyethyl-5-nitro-benzofuran (prepared as described in Example 9) and 33.0 g. of N-benzylisopropylamine in 1000 ml. of isopropanol was heated under reflux for 16 hours. The mixture was cooled, excess ethanolic hydrogen chloride was added, the solution obtained was partially evaporated under reduced pressure and then allowed to stand at 0°C. until crystallization was complete. The crystals were filtered off and washed with cold isopropanol and water to give 89.0 g. of 2-[1-hydroxy-2-(N-benzyl-N-isopropylamino)-ethyl]-5-nitro-benzofuran hydrochloride of melting point 190°–192°C. which was further processed in the manner described in Example 2 or in Example 10.

EXAMPLE 14

20 g. of 2-(1-hydroxy-2-isopropylamino-ethyl)-5-propionamido-benzofuran were mixed with 40 g. of lactose. The mixture was granulated using 0.9 g. of 10% aqueous gelatin and the granulate was mixed with 3.5 g. of maize starch. 0.6 g. of magnesium stearate were added and the mixture was compressed using conventional techniques to yield tablets each containing 200 mg. of 2-(1-hydroxy-2-isopropylamino-ethyl)-5-propionamido-benzofuran.

EXAMPLE 15

10 g. of 2-(1-hydroxy-2-isopropylamino-ethyl)-5-propionamido-benzofuran were mixed with 10 g. of lactose. The mixture was granulated using 0.5 g. of 10% aqueous gelatin and the granulate was mixed with 2.5 g. of maize starch. 0.25 g. of stearic acid were added and the mixture was compressed using conventional techniques to yield tablets each containing 100 mg. of 2-(1-hydroxy-2-isopropylamino-ethyl)-5-propionamido-benzofuran.

We claim:

1. A compound of the formula

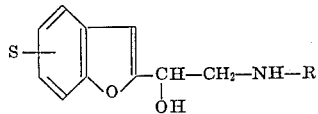

wherein R represents an isopropyl, isobutyl, secbutyl or tertbutyl group and S represents a group of the formula

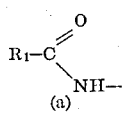

or b. $R_2$—$SO_2$—NH— in which $R_1$ represents a lower alkyl, lower alkenyl, lower alkadienyl, lower alkynyl, lower cycloalkyl, lower cycloalkyl-lower alkyl, aryl, aryl-lower alkyl, aryl-lower alkenyl or aryl-lower alkynyl group and $R_2$ represents a lower alkyl, lower alkenyl or aryl group, wherein the term aryl when used alone or in combination means phenyl or phenyl substituted with one or more halo, nitro, lower alkyl or lower alkoxy groups and acid addition salts thereof.

2. The compound of claim 1 wherein R represents an isopropyl or tertbutyl group.

3. The compound of claim 1 wherein S is present in the 5-position.

4. The compound of claim 1 wherein S is a grouping of formula (a) and $R_1$ is a lower alkyl, lower alkenyl, aryl or aryl-lower alkenyl group.

5. The compound of claim 1 which is 2-(1-hydroxy-2-isopropylamino-ethyl)-5-propionamido-benzofuran.

6. The compound of claim 1 which is 2-(1-hydroxy-2-isopropylamino-ethyl)-5-isobutyramido-benzofuran.

7. The compound of claim 1 which is 2-(1-hydroxy-2-isopropylamino-ethyl)-5-valeramido-benzofuran.

8. The compound of claim 1 which is 2-(1-hydroxy-2-isopropylamino-ethyl)-5-crotonamido-benzofuran.

9. The compound of claim 1 which is 2-(1-hydroxy-2-isopropylamino-ethyl)-5-butyramido-benzofuran.

10. The compound of claim 1 which is 2-(1-hydroxy-2-isopropylamino-ethyl)-5-cyclobutanecarboxamido-benzofuran.

11. The compound of claim 1 which is 2-(1-hydroxy-2-isopropylamino-ethyl)-5-cyclopropanecarboxamido-benzofuran.

12. The compound of claim 1 which is 2-(1-hydroxy-2-isopropylamino-ethyl)-5-cinnamido-benzofuran.

13. The compound of claim 1 which is 2-(1-hydroxy-2-isopropylamino-ethyl)-5-benzamido-benzofuran.

14. The compound of claim 1 which is 2-(1-hydroxy-2-isopropylamino-ethyl)-5-(1-cyclopentyl-acetamido)-benzofuran.

15. The compound of claim 1 which is 2-(1-hydroxy-2-isopropylamino-ethyl)-5-(1-ethyl-butyramido)-benzofuran.

16. The compound of claim 1 which is 2-(1-hydroxy-2-isopropylamino-ethyl)-5-($\beta,\beta$-dimethyl-acrylamido)-benzofuran.

17. The compound of claim 1 which is 2-(1-hydroxy-2-isopropylamino-ethyl)-5-(3-phenyl-propionamido)-benzofuran.

18. The compound of claim 1 which is 2-(1-hydroxy-2-tertbutylamino-ethyl)-5-propionamido-benzofuran.

19. The compound of claim 1 which is 2-(1-hydroxy-2-isopropylamino-ethyl)-6-propionamido-benzofuran.

20. The compound of claim 1 which is 2-(1-hydroxy-2-isopropylamino-ethyl)-7-acetamido-benzofuran.

21. The compound of claim 1 which is 2-(1-hydroxy-2-isopropylamino-ethyl)-5-acetamido-benzofuran.

22. The compound of claim 1 which is 2-(1-hydroxy-2-isopropylamino-ethyl)-5-paratoluenesulfonamido-benzofuran.

23. The compound of claim 1 which is 2-(1-hydroxy-2-isopropylamino-ethyl)-5-(hex-5-ynamido)-benzofuran.

24. The compound of claim 1 which is 2-(1-hydroxy-2-isopropylamino-ethyl)-5-sorbamido-benzofuran.

25. The compound of claim 1 which is 2-(1-hydroxy-2-isopropylamino-ethyl)-5-benzenesulfonamido-benzofuran.

26. The compound of claim 1 which is 2-(1-hydroxy-2-isobutylamino-ethyl)-5-butyramido-benzofuran.

27. The compound of claim 1 which is 2-(1-hydroxy-2-secbutylamino-ethyl)-5-(p-chlorobenzamido)-benzofuran.

* * * * *